US007457914B2

(12) United States Patent
Cordella et al.

(10) Patent No.: US 7,457,914 B2
(45) Date of Patent: Nov. 25, 2008

(54) ASYNCHRONOUS EVENT NOTIFICATION

(75) Inventors: David P. Cordella, Shrewsbury, MA (US); Lee W. VanTine, Oxford, MA (US)

(73) Assignee: EMC Corporation, Hopkinton, MA (US)

( * ) Notice: Subject to any disclaimer, the term of this patent is extended or adjusted under 35 U.S.C. 154(b) by 349 days.

(21) Appl. No.: 11/089,702

(22) Filed: Mar. 25, 2005

(65) Prior Publication Data

US 2006/0218532 A1  Sep. 28, 2006

(51) Int. Cl.
*G06F 12/00* (2006.01)
(52) U.S. Cl. .................. 711/112; 717/124
(58) Field of Classification Search .......... 711/112
See application file for complete search history.

(56) References Cited

U.S. PATENT DOCUMENTS

| 5,206,939 | A | | 4/1993 | Yanai et al. | |
|---|---|---|---|---|---|
| 5,778,394 | A | | 7/1998 | Galtzur et al. | |
| 5,845,147 | A | | 12/1998 | Vishlitzky et al. | |
| 5,857,208 | A | | 1/1999 | Ofek | |
| 6,138,121 | A | * | 10/2000 | Costa et al. | 707/100 |
| 7,093,013 | B1 | * | 8/2006 | Hornok et al. | 709/224 |
| 7,158,973 | B2 | * | 1/2007 | Mandal et al. | 707/10 |
| 2002/0010804 | A1 | | 1/2002 | Sanghvi | |
| 2003/0033428 | A1 | * | 2/2003 | Yadav | 709/238 |
| 2003/0149761 | A1 | * | 8/2003 | Baldwin et al. | 709/224 |

OTHER PUBLICATIONS

Microsoft Computer Dictionary, Fifth Edition.*
"Windows Management Instrumentation: Background and Overview", Microsoft Documentation—MSDN Library [Online], Nov. 2000.
"The Microsoft Windows Management Instrumentation—Extensions to the Windows Driver Model", Microsoft Documentation, Sep. 1998.
Cabrera, L. F., et al.: "Herald: achieving a global event notification service", Hot Topics in Operating Systems, 2001, Piscataway, NJ, USA, IEEE, May 20, 2001.
Carzaniga, A., et al.: "Design and evaluation of a wide-area event notificatin service", Foundations of Intrusion Tolerant Systems, 2003 [Organically Assured and Survivable Information Systems] 2003, Piscataway, NJ, USA, IEEE, 2003.

* cited by examiner

*Primary Examiner*—Kevin L Ellis
*Assistant Examiner*—Hashem Farrokh
(74) *Attorney, Agent, or Firm*—Muirhead and Saturnelli, LLC

(57) ABSTRACT

Described is a technique for asynchronous event notification in a data storage system. Lower level software, such as a device driver or other software application generating events, reports the occurrence of an event to an event handler. The event handler implements an event reporting policy which may include event consolidation. The event handler reports the events to an event dispatcher which notifies event subscribers of the occurrence of events in accordance with registration information of each subscriber. The event handler may execute in kernel mode or user mode depending on the particular execution mode of lower level software initially reporting the occurrence of events. There may be a hierarchical arrangement of multiple event dispatchers in connection with event reporting. Event dispatchers may implement data sharing of registration information.

20 Claims, 14 Drawing Sheets

ASYNCHRONOUS EVENT NOTIFICATION

BACKGROUND

1. Technical Field

This application generally relates to a data storage system, and more particularly to techniques used with notification of events in a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Different tasks may be performed in connection with a data storage system. For example, management tasks may be performed in connection with one or more data storage systems. A management console or station may be used to monitor the data storage systems. The management console may be provided with updates or changes regarding the data storage systems. One existing technique used in connection with providing the updates to the management console system may characterized as a polling or reporting technique. Each of the data storage systems may execute instructions which report updates to the management console at regular periodic intervals.

The foregoing technique may have existing drawbacks. The reporting by each data storage system at each interval may consume an unacceptable amount of system bandwidth and other data storage system resources. The number of incoming messages to be processed by the management console increases with the number of data storage systems and may eventually saturate or "flood" the management console and associated connection used for reporting. Additionally, reporting at periodic intervals means that any reported updates or events take at least until the next interval to be communicated to the management console. Further, more time elapses before the management console completes processing the reports once they have been received. As a result, the total time which elapses between the occurrence of an event until that event is eventually received by a system manager at the management console may not be an acceptable amount of time. The management console may be displaying, for example, stale or outdated information or may be informed about an event within an unacceptable amount of time.

Thus, it may be desirable to have an efficient technique for reporting events and updates regarding one or more data storage systems in a timely manner. It may be desirable that the technique be scalable for use with a varying number of data storage devices and events occurring therein.

SUMMARY OF THE INVENTION

In accordance with one aspect of the invention is a method for event reporting in a data storage system comprising: asynchronously reporting at least one data storage system event to an event handler; and reporting, by said event handler, said at least one data storage system event in an event report to an event dispatcher in accordance with at least one event reporting criteria. The method may also include notifying, by said event dispatcher, one or more event registrants in accordance with registration information for each of said one or more event registrants. One of said event registrants may be a software management component. The event handler may execute in kernel mode, and the method may also include receiving notification of said at least one data storage system event from a device driver. The event handler may execute in user mode and the method may also include receiving notification of said at least one data storage system event from a software component executing in user mode. The at least one event reporting criteria may include at least one of: a threshold event severity level, an event type, a time period, a message count, and a buffer size. The at least one event reporting criteria may include gathering events below said threshold event severity level for consolidated reporting to said event dispatcher in accordance with one of said time period, said message count or said buffer size. The at least one event reporting criteria may also include reporting, upon receipt, all events having at least said threshold event severity level or events of said event type. The event dispatcher may be a primary dispatcher and a first of said event registrants may subscribe to said primary event dispatcher and a secondary event dispatcher, wherein event notification to said first event registrant is performed by said secondary event dispatcher in the event that said primary event dispatcher is unable to perform event notification to said first event registrant, said primary and secondary event dispatchers sharing registration information about said first event registrant. The event dispatcher may be a first event dispatcher included in a data storage system that communicates with a second event dispatcher, said second event dispatcher notifying one or more event registrants of events in accordance with registration information for each of said one or more event registrants.

In accordance with another aspect of the invention is a system comprising: at least one data storage system including: a data storage system event generator; an event handler in communication with said data storage system event generator, said event handler asynchronously receiving notification of event occurrences from said data storage system event generator and performing event reporting consolidation in accordance with at least one criteria; and an event dispatcher that receives notification of events from said event handler and dispatches notification of events to at least one other component; and at least one registrant that receives notification of said events. The system may also include a second event dispatcher in communication with said event dispatcher, said second event dispatcher receiving notification of events from said event dispatcher, said second event dispatcher notifying said at least one registrant of events in accordance with subscription information associated with said at least one registrant. The data storage system event generator may be a device driver.

In accordance with another aspect of the invention is a computer program product for event reporting in a data storage system comprising code that: asynchronously reports at least one data storage system event to an event handler; and reports, by said event handler, said at least one data storage system event in an event report to an event dispatcher in accordance with at least one event reporting criteria. The computer program product may also include code that notifies by said event dispatcher, one or more event registrants in accordance with registration information for each of said one or more event registrants. The event handler may execute in kernel mode, and the computer program product may further comprise code that: receives notification of said at least one data storage system event from a device driver. The event handler may execute in user mode and the computer program product may further comprise code that: receives notification of said at least one data storage system event from a software component executing in user mode. The at least one event reporting criteria may include at least one of: a threshold event severity level, an event type, a time period, a message count, a buffer size, gathering events below a threshold event severity level for consolidated reporting to said event dispatcher in accordance with one of said time period, said message count or said buffer size, and reporting, upon receipt, all events having at least said threshold event severity level or events of said event type. The event dispatcher may be a primary dispatcher and a first of said event registrants may subscribe to said primary event dispatcher and a secondary event dispatcher, wherein event notification to said first event registrant is performed by said secondary event dispatcher in the event that said primary event dispatcher is unable to perform event notification to said first event registrant, said primary and secondary event dispatchers sharing registration information about said first event registrant. The event dispatcher may be a first event dispatcher included in a data storage system that communicates with a second event dispatcher, said second event dispatcher notifying one or more event registrants of events in accordance with registration information for each of said one or more event registrants.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
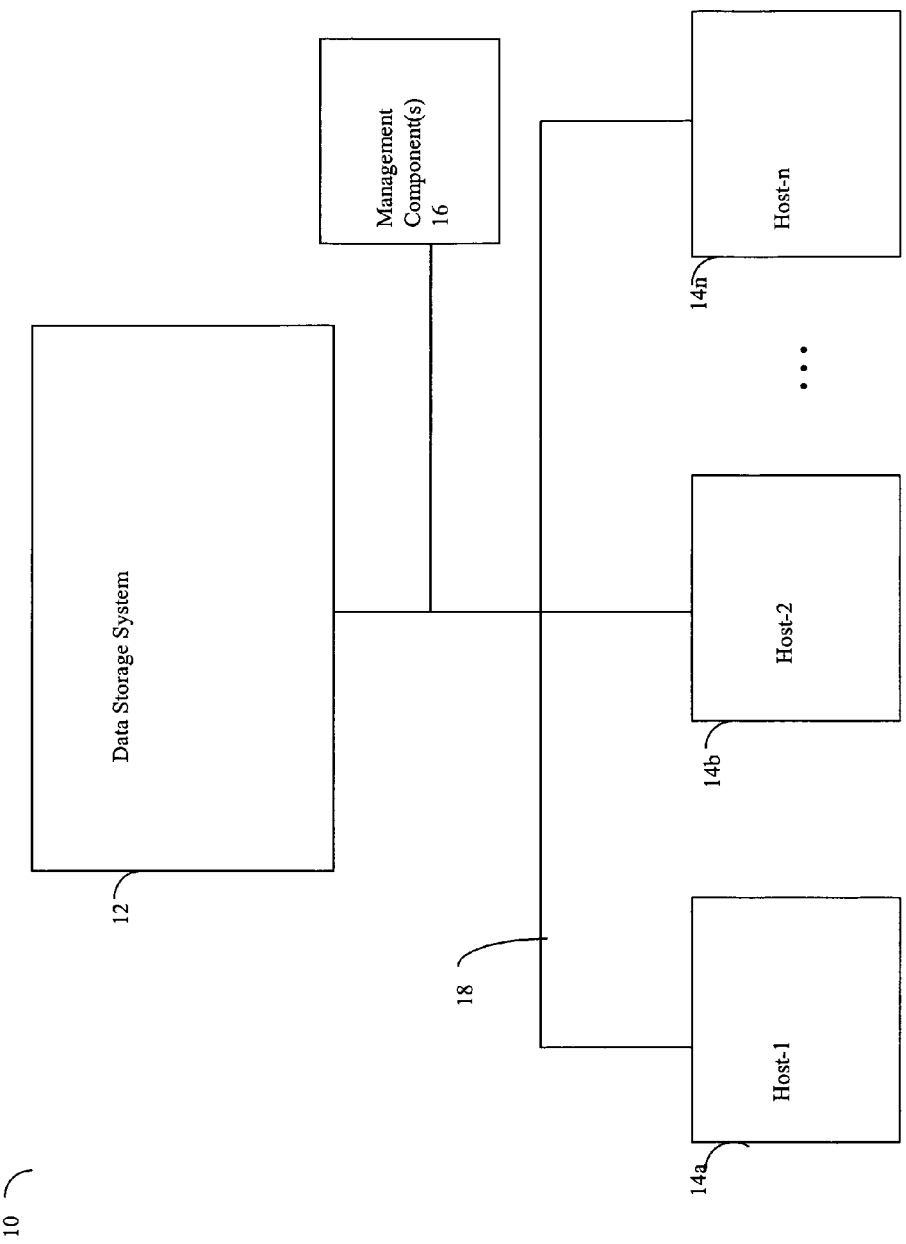
FIG. 1 is an example of an embodiment of a computer system that may utilize the techniques described herein.

Referring now to FIG. 1, shown is an example of an embodiment of a computer system that may be used in connection with performing the event notification techniques described herein. The computer system 10 includes a data storage system 12 connected to host systems 14a-14n and management component(s) 16 through communication medium 18. In this embodiment of the computer system 10, the management component(s) 16, and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n, the management component(s) 16, and the data storage system 12 included in the computer system 10 may be connected to the communication medium 18 by any one of a variety of connections as may be provided and supported in accordance with the type of communication medium 18. The processors included in the host computer systems 14a-14n and management component(s) 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n, the management component(s) 16 and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

As will be described in more detail herein, the management component(s) 16 may be used in connection with management of the data storage system 12. The management component(s) 16 may include one or more computer processors connected to one or more I/O devices such as, for example, a display or other output device, and an input device such as, for example, a keyboard, mouse, and the like. A data storage system manager may, for example, view a current storage volume configuration on a display device of the management component(s) 16. The information displayed may include, for example, a list of logical volumes or units for a current configuration. Events which occur in the data storage system 12 may be reported to the management component(s) 16. These events may include, for example, changes in device configuration such as the addition/removal of a physical or logical device, a hardware failure, a connection failure, a power supply failure, a device state change, and the like. Techniques that may be used in connection with event reporting, notification, and management are described in more detail elsewhere herein.

Figure 2A:
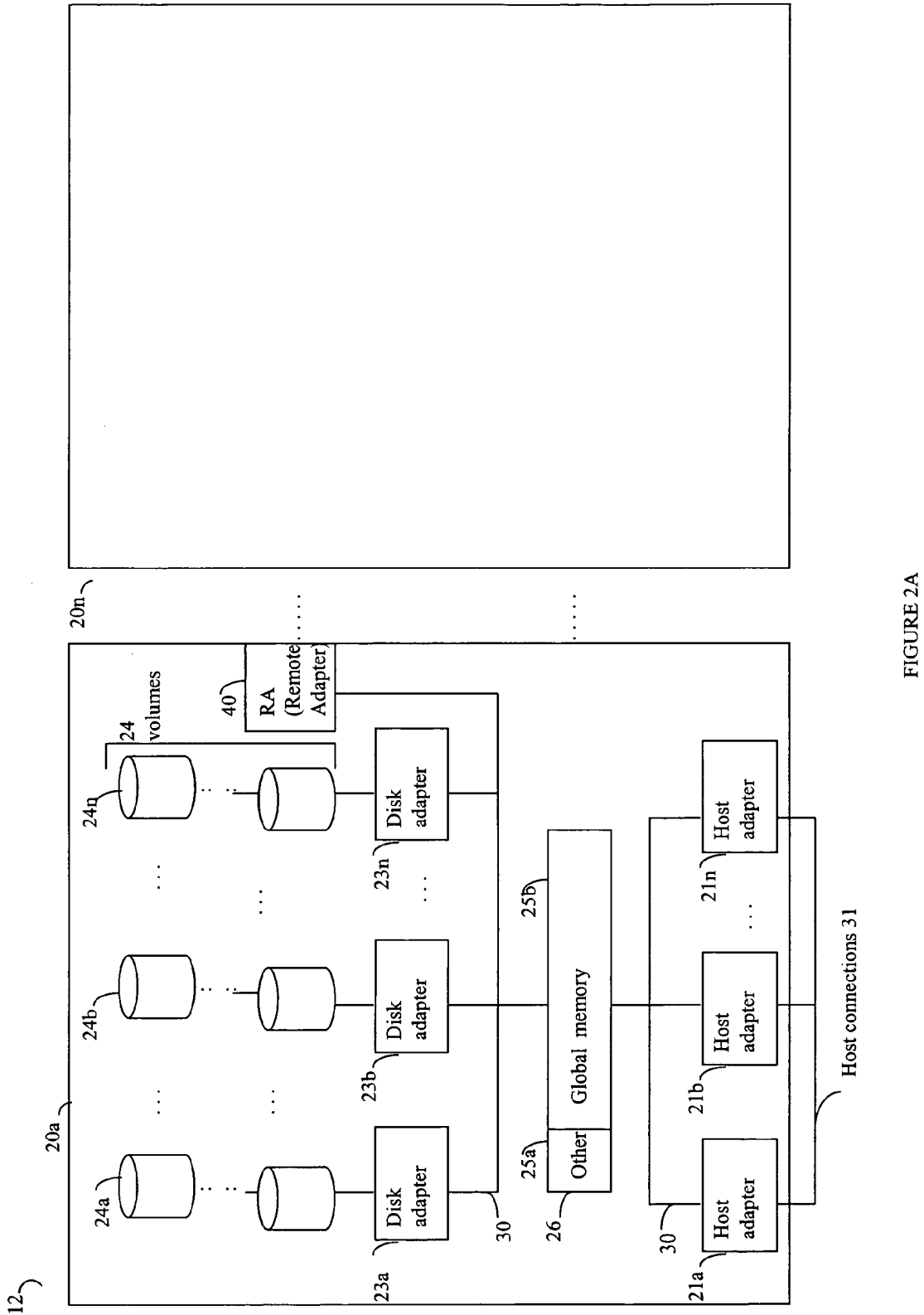
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
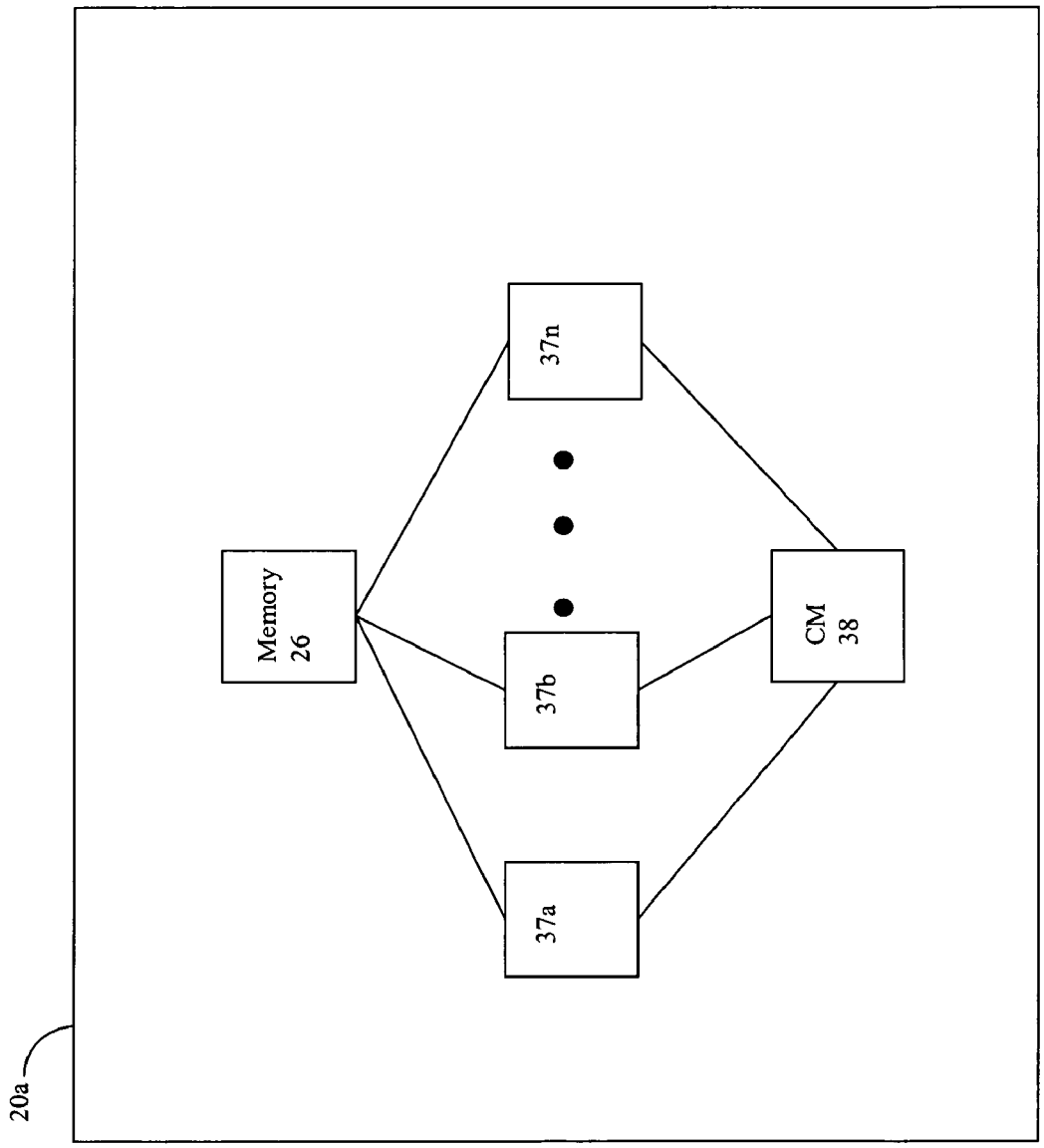
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
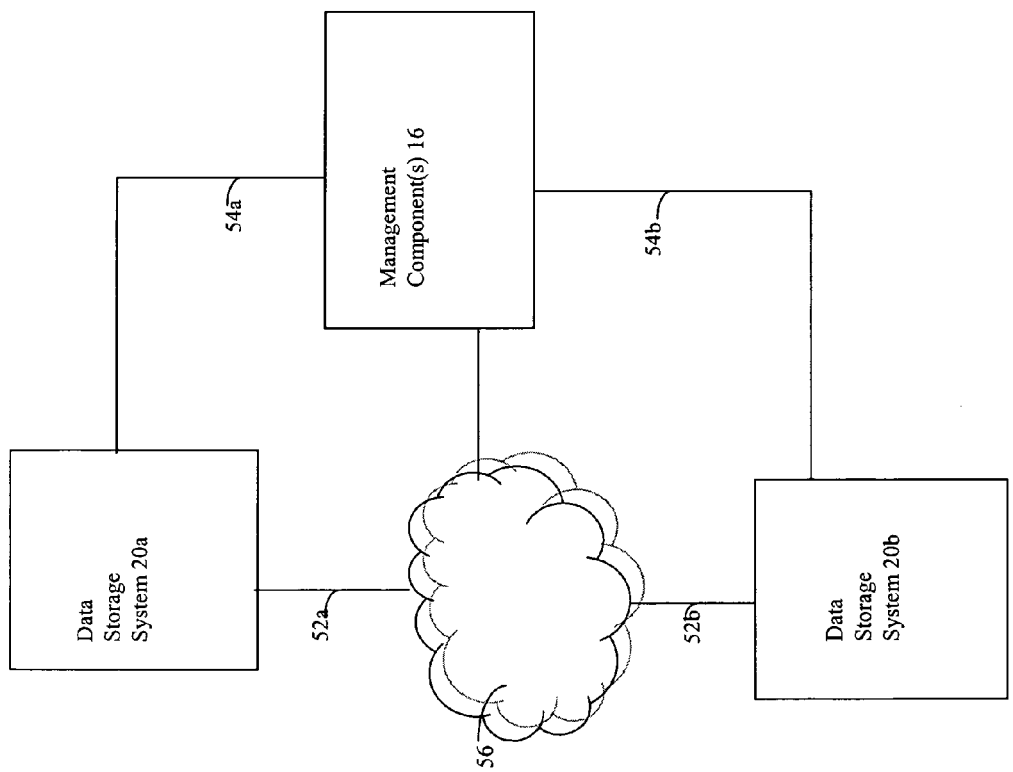
FIG. 3 is a more detailed example of an embodiment of a computer system that may utilize the techniques described herein.

Referring now to FIG. 3, shown is an example 50 of components that may be used in connection with techniques described herein. Included in the example 50 are data storage systems 20a and 20b and management component(s) 16. The data storage systems 20a and 20b may be, for example, data storage systems as manufactured by a single vendor such as EMC Corporation. An embodiment may also include data storage systems from multiple vendors. These, and other particulars described herein for the purposes of example and illustration should not be construed as a limitation of the techniques. The data storage systems 20a and 20b and the management component(s) 16 may communicate through the switching fabric 56. The elements 20a, 20b and/or 16 may communicate with one another for purposes of I/O on a first path through the switching fabric 56 such as, for example, through a fibre channel connection. The elements 20a, 20b and/or 16 may communicate through a second different path in connection with management of the data storage systems 20a and 20b. The second path may be, for example, over connections 54a and 54b. In one embodiment, connections 54a and 54b may be TCP/IP connections. Although an embodiment may use separate paths for I/O and data storage management, an embodiment may also use the same path for both I/O and data storage system management as well as multiple paths in connection with I/O and/or management. Additionally, the particular types of communication paths may vary in accordance with each embodiment. For example, the communication path used in connection with data storage management may also include a switching fabric. The types of connections used for data storage system management and/or I/O may include, for example, a fibre channel, SCSI, or other communication connection.

It should be noted that the particular one or more elements that may be included in the management component 16 may vary with each particular embodiment. As described elsewhere herein, the management component 16 may include, for example, a computer system which has a processor and a display device. The processor may execute instructions to display information about the storage system to a storage system manager. Software executing on the computer system of the management component 16 may also be used in connection with obtaining user input, such as may be obtained from the data storage system manager in connection with data storage system events. Data storage system event information may be displayed on the display device.

The number of elements included in management component 16 may vary with the complexity of the storage system as well as the particular applications and tasks performed in an embodiment. For example, management component 16 may include only a single computer system or processor with a single display device. Alternatively, an embodiment may require greater complexity in connection with management of the data storage system. Thus, the management component 16 may also include additional software and/or hardware. Particular examples of different embodiments of the management component 16 are described elsewhere herein.

Techniques will now be described in connection with asynchronous event notification as may be used in connection with one or more data storage systems in an embodiment of the computer system 10 of FIG. 1. Asynchronous event notification may be used in connection with techniques for data storage system event reporting and management. The events may include, for example, hardware failures, device state changes, power failures, and the like, as may occur within a data storage system. As applied to data storage system configuration, asynchronous event notification may be used as a technique by which the data storage systems, such as 20a and 20b of FIG. 3, may provide notification of particular data storage system events to one or more recipients or registered subscribers such as, for example, management component 16, or portions of the management component 16, as will also be illustrated in connection with techniques described herein.

As will be appreciated by those of ordinary skill in the art, techniques described herein for asynchronous event notification may be characterized as scaleable for use with a small number of data storage systems and/or subscribing applications or management components, as well as larger number of such elements. As also will be described in following paragraphs, the techniques described herein may be used in connection with an embodiment utilizing code that executed in both kernel and application or user space, as well as elements executing solely in user space.

Figure 4:
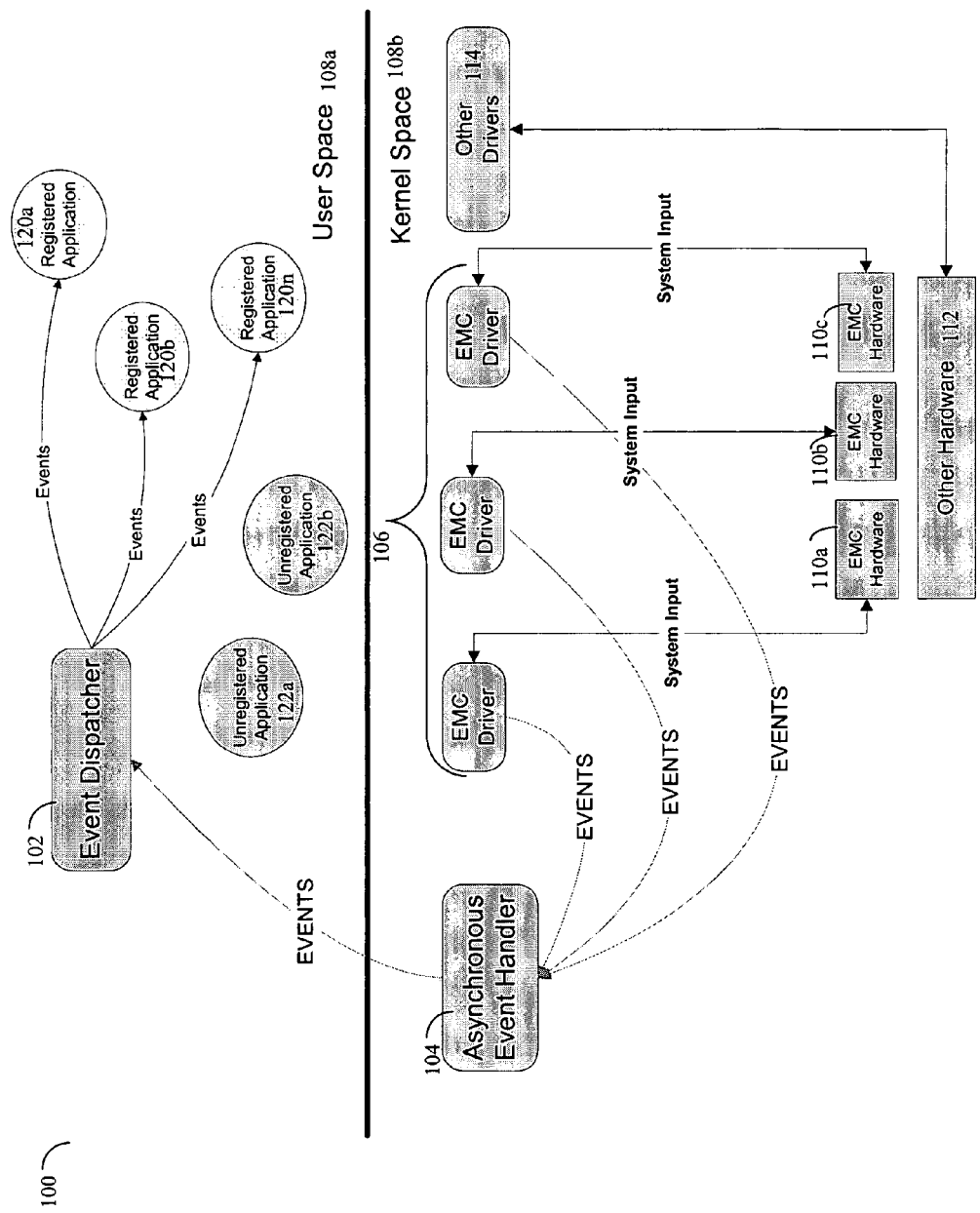
FIG. 4 is an example of components that may be included in an embodiment utilizing the asynchronous event notification techniques described herein.

Referring now to FIG. 4, shown is an example 100 of components that may be included in an embodiment in connection with using asynchronous event notification techniques. It should be noted that the components 100 of FIG. 4 (except for the registered and unregistered applications) may be included in each data storage system of an embodiment, such as each data storage systems 20a and 20b, Alternative embodiments are described in following paragraphs. It should be noted that FIG. 4 illustrates a particular architecture that may be implemented in an embodiment in which the data storage system uses both kernel space and user space for execution of components described herein. Illustrated in FIG. 4 is a division between those components that may be executed in user space 108a and kernel space 108b in one embodiment. User space 108a may include an event dispatcher 102, one or more registered applications such as 120a-120n, and one or more unregistered applications such as 122a and 122b. Components executing in kernel space 108b may include the asynchronous event handler 104 and device drivers 106 that may interface with one or more hardware components 110a-110c, for example, by a vendor such as EMC Corporation. Other components executing in kernel space 108b may include other device drivers 114 which communicate with other hardware 112. In this particular embodiment, the hardware 110a-110c may be the various hardware components included in a data storage system. Each of the device drivers included in 106 may be used in connection with communicating to various hard ware components such as 110a-110c that may be included in the data storage system. The hardware components 110a-110c may signal their respective device drivers regarding any hardware changes or events. If there is a hardware state change such as, for example, a power failure, a new device coming on line, a particular device going off line, a connection failure, and the like, the occurrence of the state change is communicated to the appropriate device driver included in 106. The device driver 106 then sends notification of such events to the asynchronous event handler 104 which, in this example, executes in kernel space 108b. In one embodiment, the event dispatcher 102, the asynchronous event handler 104, and one or more associated device drivers 106 may be implemented using software that executes on each of the data storage systems.

The asynchronous event handler 104 may be characterized as an event consolidator serving as a gathering or focal point for receiving notification of hardware events from selected device drivers 106. The asynchronous event handler 104 may use any one of a variety of techniques to gather, consolidate and otherwise decide, which events are sent to the event dispatcher 102 at what times. The particulars used in connection with communicating event(s) to the event dispatcher 102 may vary with each particular embodiment. Examples of techniques that may be used in connection with event notification and consolidation are described in more detail elsewhere herein.

It should be noted that the particular algorithms implemented by the asynchronous event handler in event consolidation may consider various factors. The particular algorithms implemented by the asynchronous event handler may consider, for example, the number of components and drivers that report to any single asynchronous event handler, and the available resources, such as buffer space for collecting received events for consolidation. Reporting all of the events to the event dispatcher one at a time may cause performance issues and this inefficiency increases as the number of components and events increases. In an embodiment using the kernel-space to user-space architecture of FIG. 4, when the execution context of a process changes from kernel to user space (e.g., asynchronous event handler 104 communicating with the event dispatcher 102), additional system resources are utilized to perform a context switch. An embodiment may also consider an acceptable time period within which any event should be reported to the event dispatcher and/or registered application. Additionally, an embodiment may consider that there are events of a particular severity level, type, and the like, that may be reported immediately independent of one or more other factors. Based on the foregoing, an embodiment may consider reducing the number of kernel to user space context switches, setting particular thresholds (e.g., severity levels to immediately report, acceptable time period notification and age of a received event report), and providing for consolidation of events sent from the asynchronous event handler to the event dispatcher. The particular factors considered and any related thresholds and policies may vary with each embodiment.

The event dispatcher 102 may receive consolidated event reports from the asynchronous event handler 104. Subsequently, the event dispatcher 102 may report events to one or more registered applications 120a-120n. A registered application may be, for example, a software management component executing on a management console or station such as may be included in the management component 16 as previous described in connection with FIGS. 1 and 3.

An embodiment may provide for selective notification of particular events by the event dispatcher 102 to each application that may be registered with a particular event dispatcher 102. Prior to receiving event notification, a particular application, such as a software management component, may register with the event dispatcher 102 to receive notification regarding selected events of interest. The registration process may be performed by executing instructions to obtain an application's registration information and then to communicate the registration information to the event dispatcher 102. The registration information may include, for example, information used to designate a location of where to send a notification for a registered application (e.g., network address, application name), and data identifying the events of interest to be reported to the application. For example, an application included in the management component may register to receive all events associated with all the data storage systems included in an embodiment. Alternatively, an embodiment may divide the task of data storage system management and configuration among multiple management components. A first portion of data storage systems may be assigned to a first management component. A second portion of the data storage systems may be assigned to a second different management component. Each of these management components may register as an application to be notified of all events for each of their respective portions of data storage systems. In one embodiment, events may be categorized in a hierarchical manner by a number of severity categories. For example, in one embodiment, one of three severity levels may be associated with the occurrence of each event with a level 1 being the most serious and a level 3 being the least severe. It may be that the management component in one embodiment does not wish to know about any level 3 events that occur and register to receive reports for level 1 and 2 events. By providing for this selective subscription of event notification, use of system resources, such as network bandwidth for messaging between an event dispatcher and a registered application, may be minimized to include only those messages of particular interest to an application. Alternatively, in the event that an event dispatcher does not provide for the foregoing selective registration, the event dispatcher may otherwise notify all registered applications of all events within a system. Upon receiving the notification, the registered application may then filter each incoming message as received to decide whether each incoming notification is of interest. In the embodiment of FIG. 4, the event dispatcher 102 performs the foregoing filtering via the selective event notification using the registration information. The particular filtering is done by the event dispatcher 102 rather then being performed by each application after incurring the associated expense with sending or reporting the events to each registrant.

It should be noted that on each of the data storage systems as described herein, any one of a variety of different operating systems and software may be executing thereon. For example, in one embodiment each of the data storage systems may be executing a Windows-based system, a LINUX-based system, and the like.

Figure 4A:
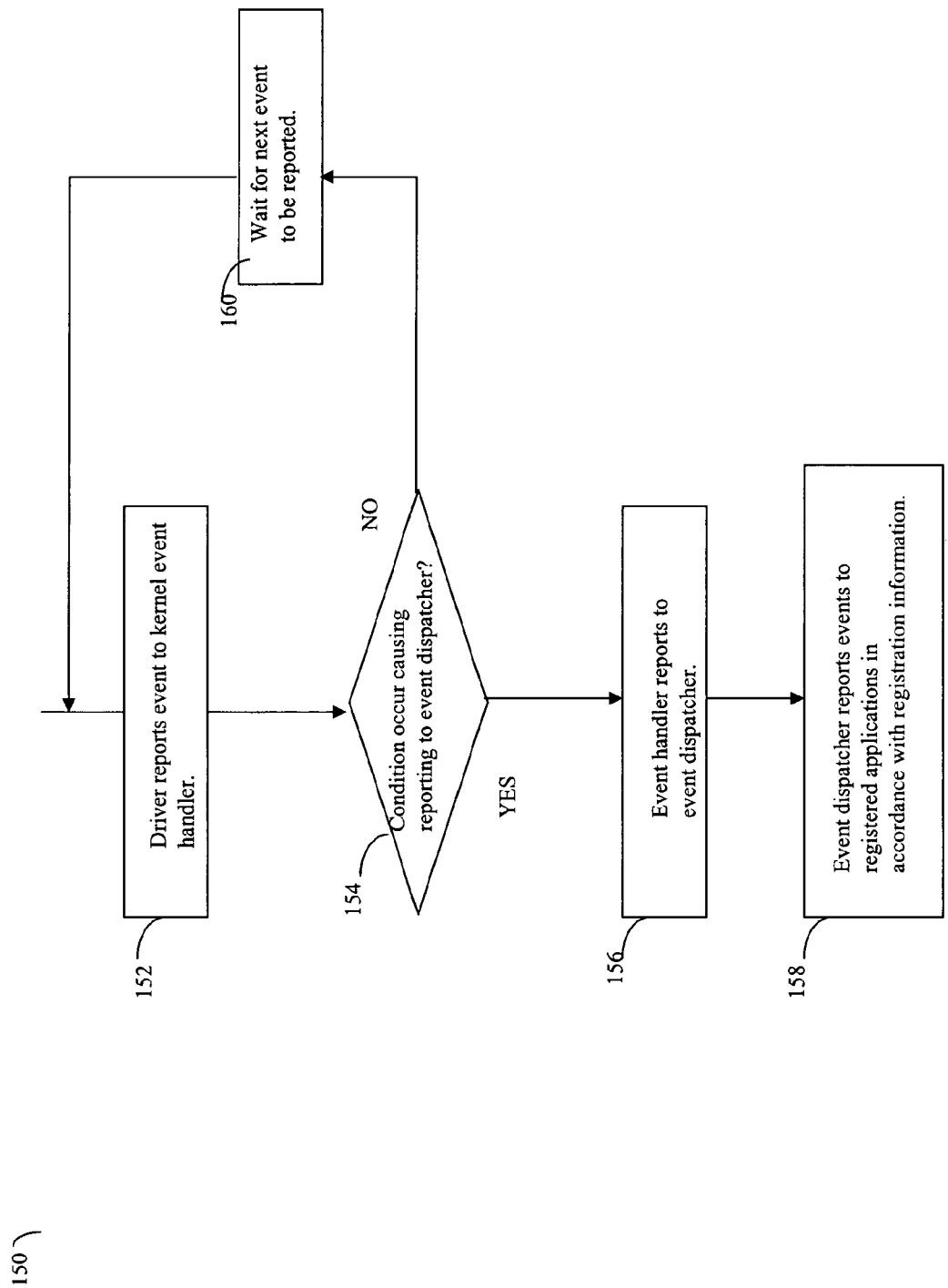
FIG. 4A is a flowchart of processing steps that may be performed in an embodiment in connection with asynchronous event handling and dispatching.

Referring now to FIG. 4A, shown is a flowchart 150 of processing steps that may be performed in an embodiment in connection with asynchronous event handling and dispatching. It should be noted that the processing steps of the flowchart 150 of FIG. 4A generally summarizes the processing just described in connection with FIG. 4. At step 152, one or more of the device drivers report events to the kernel event handler. Subsequently, control proceeds to step 154 where the kernel event handler determines if a particular condition has occurred at this particular time which causes the event handler to report to the user space event dispatcher. The particular one or more conditions that may trigger the kernel event handler into communicating with the event dispatcher may vary in accordance with each embodiment. Particular examples are described in more detail in following paragraphs. Upon the occurrence of such a condition at step 154, control proceeds to step 156 where the kernel event handler sends an event report to the event dispatcher executing in user space. Subsequently, the event dispatcher reports events to the registered applications in step 158 in accordance with registration information. If at step 154 it is determined that reporting to the event dispatcher should not occur at this time, control proceeds to step 160 to wait for the next event to be reported by a device driver.

It should be noted that steps of flowchart 150 generally describe one path for event reporting with reference to the components of FIG. 4 and may identify one particular function performed by a referenced component at a point in time. Each of the different components in an embodiment, such as 100 of FIG. 4, may perform other processing steps and may also repeatedly perform a same process. For example, each of the device drivers may continue to asynchronously report new events to the asynchronous event handler while the asynchronous event handler may be in the process of communicating with the event dispatcher 102 in user space. The asynchronous event handler 104 may be another device driver which receives communications from other device drivers such as 106. Events received by the asynchronous event handler 104 may be queued in a buffer or other storage space. The asynchronous event handler 104 may report events to the event dispatcher 102 while the event dispatcher 102 is in the process of sending out reports to one or more registered applications. The incoming messages to the event dispatcher 102 may also be queued for processing by the event dispatcher 102.

Figure 4B:
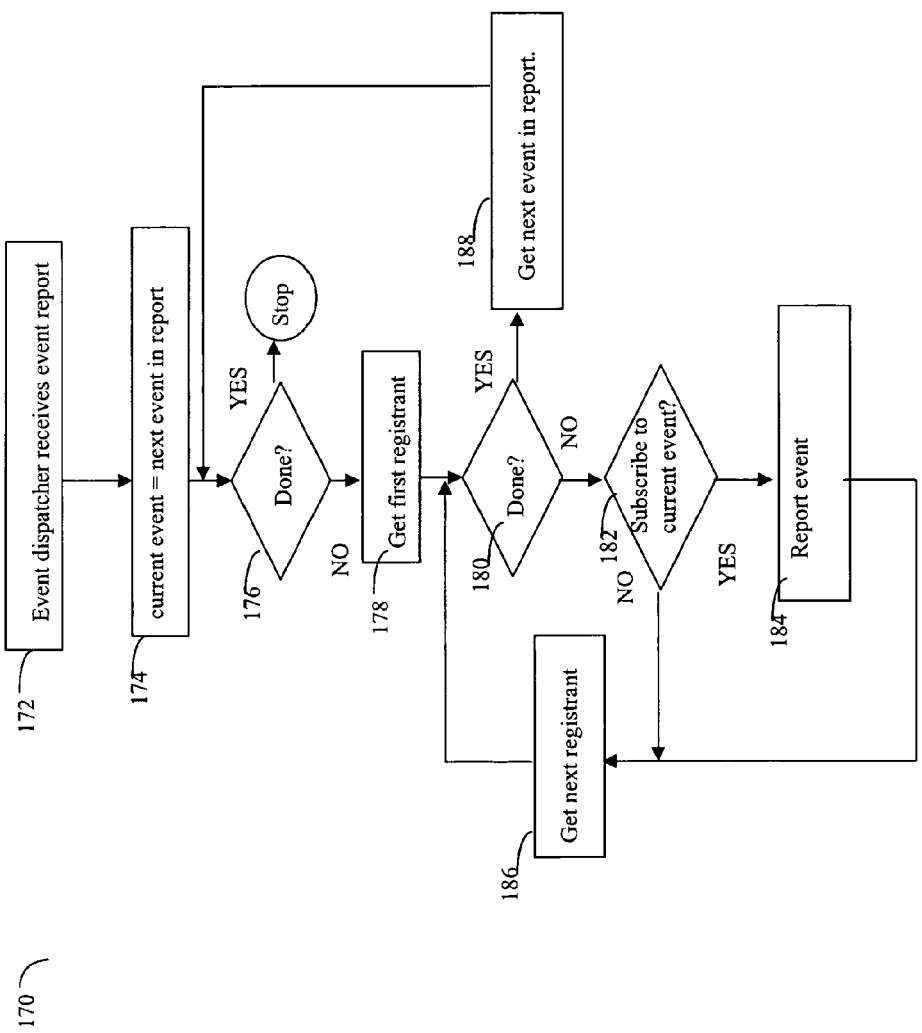
FIG. 4B is a flowchart of processing steps that may be performed in an embodiment in connection with reporting event by an event dispatcher.

Referring now to FIG. 4B, shown is a flowchart 170 of processing steps that may be performed in an embodiment in connection with reporting of events by an event dispatcher to one or more registered applications. At step 172, an event dispatcher receives an event report. The event report may include information about one or more data storage system events that are consolidated into a single report. At step 174, a current event is assigned to be the next event in the report. At step 176, a determination is made as to whether all events within the event report have been processed. If so, processing stops. Otherwise control proceeds to step 178 to obtain information on the first registrant of the event dispatcher. At step 180 a determination is made as to whether all the registrants have been processed. If so, control proceeds to step 188 to get the next event in the report and control proceeds to step 176 to continue processing the next event in the report. At step 180 if a determination is made that all registrants have not yet been processed with respect to the current event, control proceeds to step 182 to determine if the current registrant should receive notification of the current event. If not control proceeds to step 186 to get the next registrant and processing proceeds to step 180. Otherwise, if step 182 determines that the current registrant should receive notification of the current event in accordance with registration information for the current registrant, control proceeds to step 184 to report this event to the registrant. Subsequently the next registrant is obtained at step 186. Control proceeds to step 180.

Generally, the processing of flowchart 170 in this example processes each event included in an event report received from the kernel event handler. For each event, a determination is made as to whether each registrant should receive notification for the particular event. It should be noted that in connection with reporting events to the registrant such as, for example, illustrated at step 184, any one of a variety of different techniques may be used. A technique may be used in reporting events to a registrant which involves possible consolidation of event reports. For example, rather than report each event in a different message to each registrant, the event dispatcher 102 may report immediately all events of a particular severity level, such as level 1 events. Otherwise, the event dispatcher 102 may consolidate events of a class 2 or 3 and report those in accordance with other criteria (e.g., within a predetermined reporting time period that may also be specified by each registrant as part of registration). This may further reduce the amount of bandwidth consumed and used in connection with event notification and reporting. The particular techniques used by the event dispatcher 102 in connection with performing event reports to each of the registered applicants may vary with each embodiment.

Figure 4C:
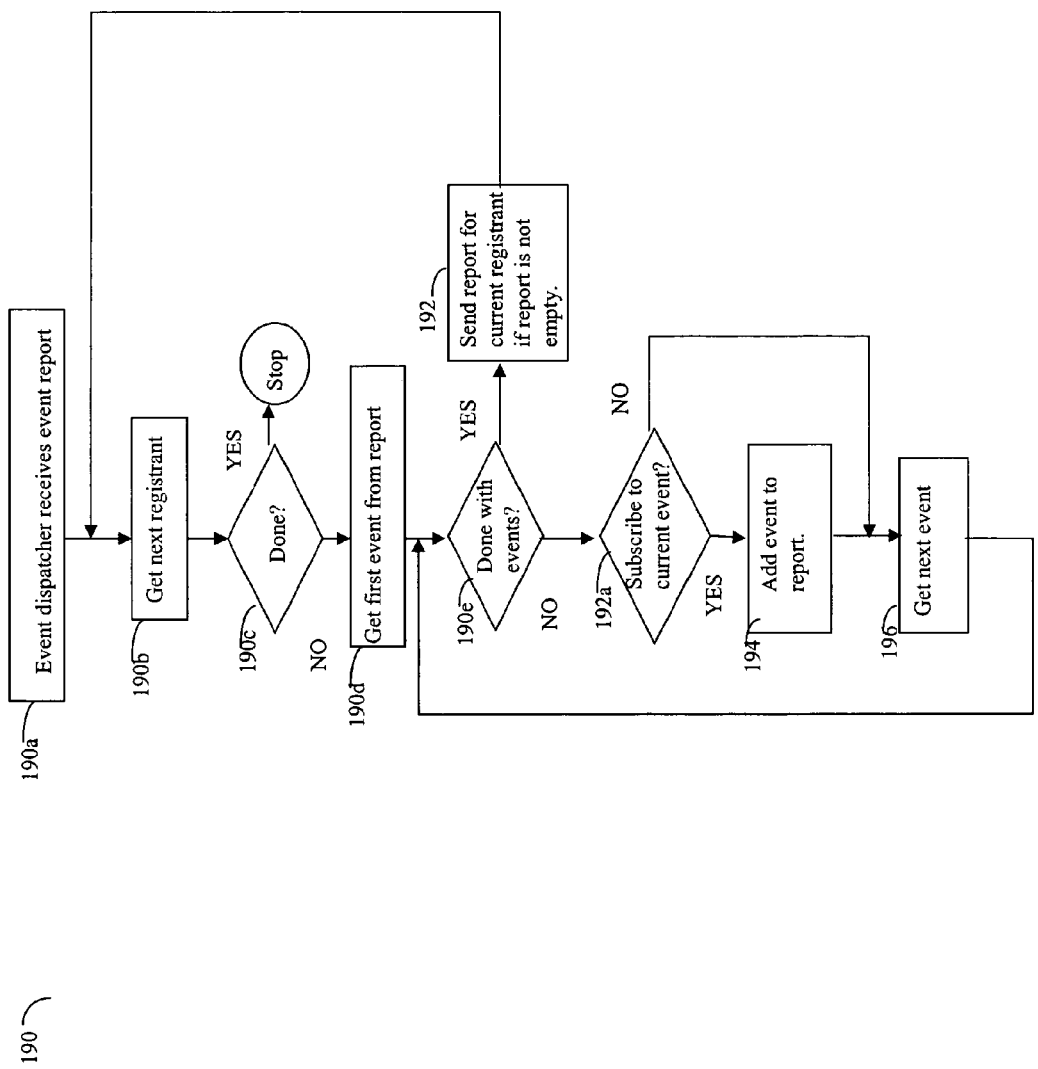
FIG. 4C is a flowchart of processing steps that may be performed in another embodiment in connection with reporting event by an event dispatcher.

Referring now to FIG. 4C, shown is a flowchart 190 of processing steps of another embodiment in connection with reporting of events by an event dispatcher to one or more registered applications. In connection with reporting events to one or more registered applications 120*a*-120*n*, an embodiment may also coalesce all available events for a particular registered applicant and send all these events in a single report. Flowchart 190 details an example of the foregoing in which all events in a received report are examined for each registrant to determine which events that particular registrant subscribes to. The events identified in the received report as being of interest for each registrant are consolidated into a single registrant event report and sent to each registrant. This is in contrast, for example, to the processing of flowchart 170 of FIG. 4B where a notification is sent to each registrant for each event identified in the received report. Referring back to FIG. 4C, at step 190*a*, the event dispatcher receives an event report. At step 190*b*, the next registrant and associated information is obtained. At step 190*c*, a determination is made as to whether all registrants have been processed. If so, processing stops. Otherwise, control proceeds to step 190*d* to obtain the first event from the received report. At step 190*e*, a determination is made as to whether processing of all events for the current registrant is complete. If so, control proceeds to step 192 to send out a consolidated registrant event report, if the report includes events. It may be that the current received report does not include any events to which the current registrant subscribes causing the registrant event report to not include any events. Control proceeds to step 190*b* for processing the next registrant. If step 190*e* evaluates to no, control proceeds to step 192*a* where a determination is made as to whether the current registrant subscribes to the current event. If not, control proceeds to step 196 to process the next event in the received report. Otherwise, control proceeds to step 194 to add the event to the consolidated registrant event report and then obtain the next event in step 196. Control proceeds from step 196 to step 190*e*.

The steps flowchart 190 may be performed as an alternative to flowchart 170 (FIG. 4B) processing for event reporting to registered applications. Other embodiments may use other reporting techniques for event consolidation than as described herein.

It should be noted that with reference to the components of FIG. 4, a variety of different configurations are possible. The event dispatcher 102, asynchronous event handler 104 and one or more registered applications may be located on the same system. In another configuration, the event dispatcher 102 and the asynchronous event handler 104 may be located on a different system from one or more of the registered applications 120a-120n. The particular configuration may vary in accordance with each embodiment and other variations of the foregoing will be readily apparent by those of ordinary skill in the art.

It should also be noted that the particular embodiment described in connection with FIG. 4 includes elements of the management component 16 that may be executed in both kernel space and user space. The management component of FIG. 4 may include the event dispatcher 102 and the asynchronous event handler 104. An embodiment may also be implemented using the foregoing components executing only in user space. Such a system may use the asynchronous event notification techniques described in connection with FIG. 4 but with the difference that the asynchronous event handler executes in user space.

Figure 5:
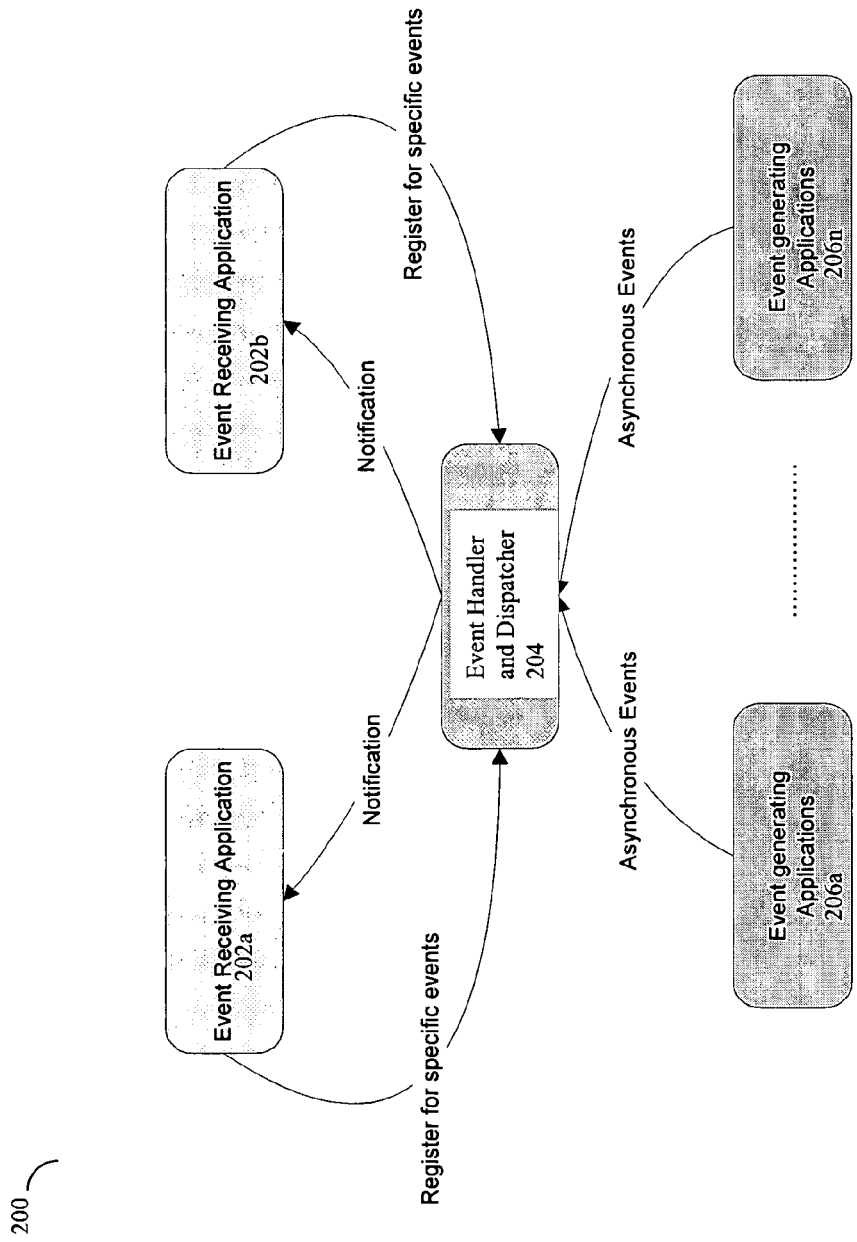
FIG. 5 is an example of an embodiment of components that may be used in connection with the asynchronous event notification techniques executing in user space.

Referring now to FIG. 5, shown is an example of an embodiment 200 of the particular components that may be used in connection with implementing the asynchronous event notification techniques described herein for execution in user space. In this particular example, the event handler and dispatcher 204 may perform the functions as a single software component that were previously performed, for example, by the event dispatcher 102 and the asynchronous event handler 104. Alternatively, an embodiment may utilize multiple software components rather than consolidate the functionality into a single component as illustrated in connection with FIG. 5. The operation of the components in the example 200 are similar to those described in connection with FIG. 4. The event generating applications 206a-206n may be, for example, software emulation layers reporting asynchronous events to the event handler and dispatcher 204. The event generating applications 206a-206n report the occurrence of events, for example, rather than the different device drivers as previously described as element 106 in connection with FIG. 4. The fact that communications occur with the event generating applications 206a-206n which do not execute in kernel mode means that the asynchronous event handler does not need to execute in kernel mode. Accordingly, the functionality of the event handler which receives the asynchronous events as reported from the applications 206a-206n may be consolidated with the dispatcher component into a single component 204. The asynchronous events are reported to element 204. Element 204, which in this example also includes the dispatching functionality, then notifies the particular applications 202a and 202b in accordance with the particular registration information for each of the applications.

Such a system executing in user space as illustrated in FIG. 5 may be used in connection with, for example, virtual backup systems, virtual event handlers, and the like. Such systems executing in user space may communicate with components other than device drivers in connection with event reporting, and may also communicate with components that do not execute in kernel mode to implement the event notification techniques described herein.

Figure 6:
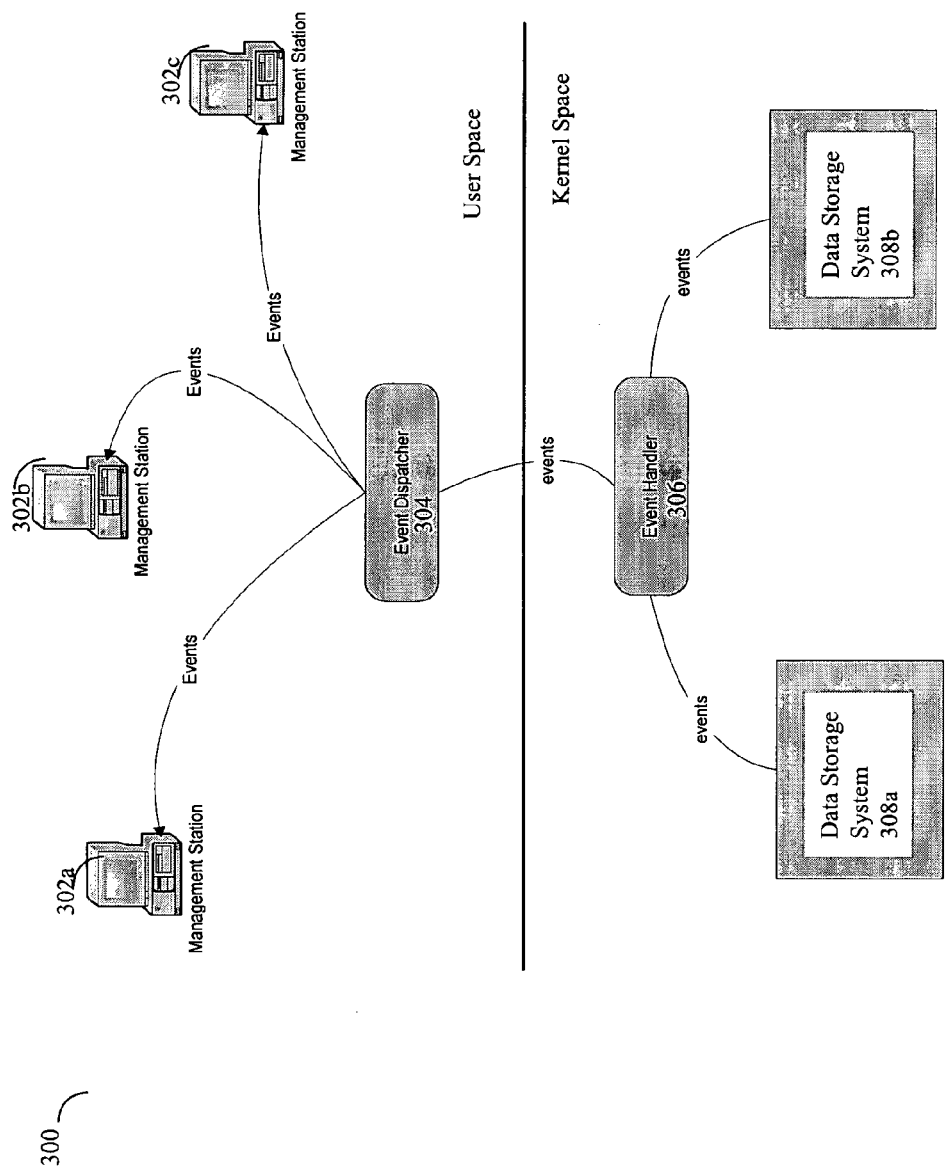
FIG. 6 is an example of another embodiment of components that may be included in a system for use with the asynchronous event notification techniques.

Referring now to FIG. 6, shown is another embodiment 300 of components that may be included in a system used in connection with the asynchronous event notification techniques described herein. In the particular example 300 of FIG. 6, the event handler 306 may consolidate and receive events reported from more than one data storage system, such as 308a and 308b. The event handler 306 may receive event notification from both 308a and 308b, for example, if the particular communication connection between each of the data storage systems 308a and 308b and the particular component including the event handler 306 is a fiber channel or a SCSI connection, for example. In other words, the particular connection used in an embodiment for communications between the event handler and a data storage system may determine whether the event handler 306 may reside at a location other than on a data storage system such as 308a or 308b. In this example 300, the event handler executes in kernel space and communicates with each of the data storage systems to receive any reported events in kernel space as well. Thus, the particular arrangement in the example 300 of FIG. 6 may be used in accordance with the particulars of each embodiment. It should be noted that the other components of the example 300 of FIG. 6 operate as described elsewhere herein in connection with other figures. That is, the event handler 306 reports events received to the event dispatcher 304 which then notifies one or more registered applications, such as each of the management stations 302a-302c.

Figure 7:
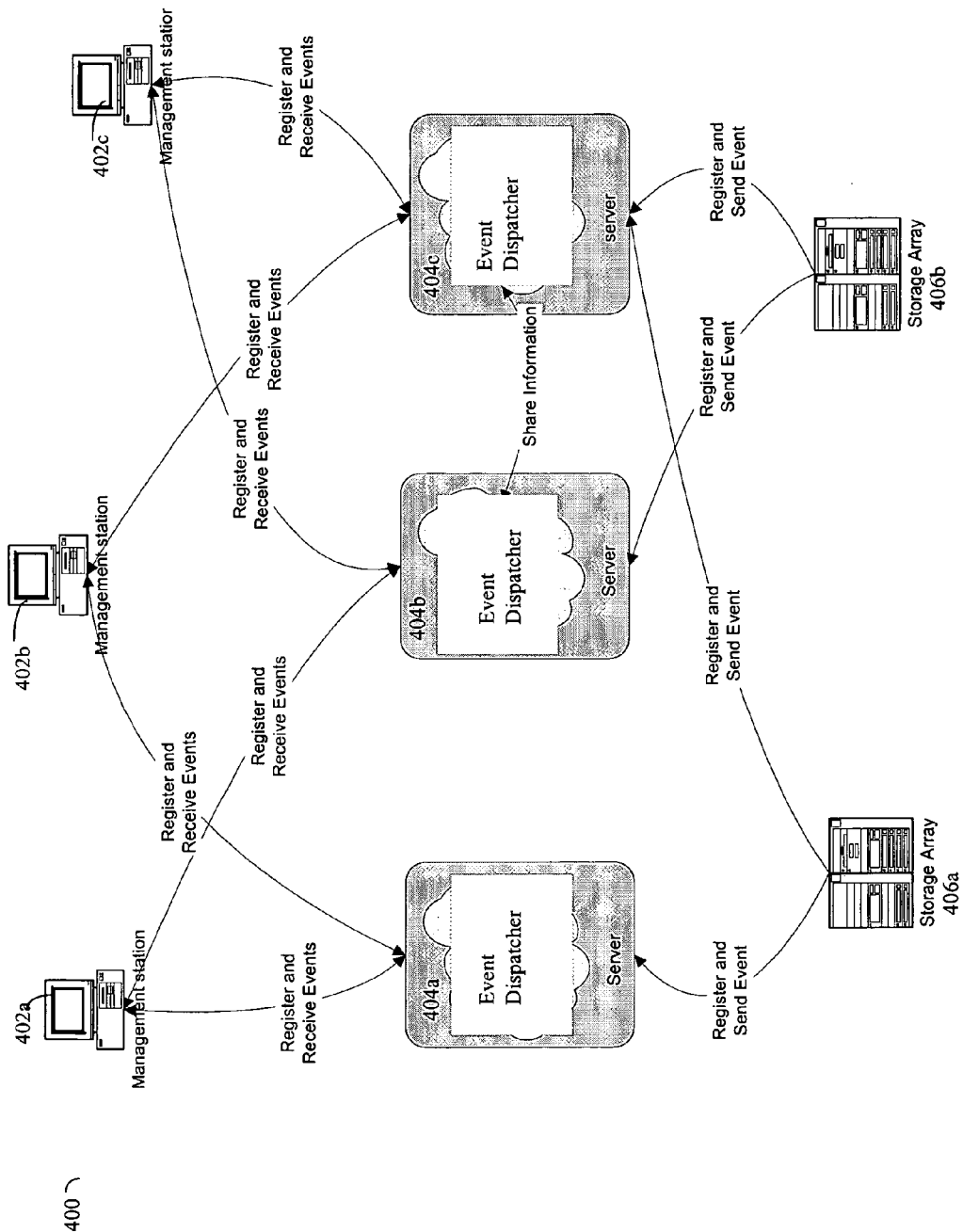
FIG. 7 is an example of another embodiment of components that may be included in a system for use with the asynchronous event notification techniques.

Referring now to FIG. 7, shown is another example 400 of components that may be used in connection with asynchronous event notification with data storage systems. In the example 400, each of the data storage systems 406a and 406b may implement components executing in both user and kernel mode as described, for example, in connection with 100 of FIG. 4. Thus, each data storage system 406a and 406b may include an event dispatcher and an asynchronous event handler. The example 400 also includes additional event dispatchers on servers 404a-404c. Rather than report events from the event dispatcher included in each of the data storage systems directly to registered applications (e.g., management stations 402a-402c), each of the data storage systems may communicate with another event dispatcher in one or more of the servers 404a-404c. The example 400 of FIG. 7 illustrates another layer in a hierarchy used in connection with data storage system management and event reporting using the asynchronous event notification techniques described herein. As described previously, each of the management stations or registered applications such as 402a-402c may register with one or more event dispatchers. However, in this example the event dispatchers with whom an application may register is included in servers 404a-404c. Applications included in each of the management stations may register with one or more event dispatchers on one or more of the servers 404a-404c. In one example, each management station may register with one or more event dispatchers on one or more servers 404a-404c by subscribing to different portions of events. For example, management station 402a may register with event dispatcher on 404a to receive notification upon the occurrence of a first set of events. Management station 404a may also register with event dispatcher of server 404b for a second different set of events. Each of the event dispatchers included in 404a and 404b may accordingly notify the management station 402a upon the occurrence of each of the particular event registrations. As another example, a management station 402a may register with more than one event dispatcher on more than one server designated a primary server and a failover server. A first event dispatcher may be designated as a primary dispatcher and a second event dispatcher may be designated as a secondary or failover event dispatcher. The primary dispatcher may be, for example, event dispatcher of 404a. The primary dispatcher may serve as the dispatcher for all events according to the particular registration for the management station 402a. In the event that, for example, server 404a were to go offline, the second or failover designated event dispatcher on a different server may be used automatically such that the management station 402a seamlessly continues to receive notification of data storage system events. In the event that the primary dispatcher comes back on line in the particular server, event reporting may resume or continue with the primary dispatcher.

The foregoing are just some examples of some techniques that may be used in connection with asynchronous event notification and reporting in the system such as illustrated in 400 of FIG. 7. It should be noted that an embodiment may include more than one layer of servers and event dispatchers.

In addition to each of the management stations registering with one or more event dispatchers on one or more servers, each of the data storage systems 406a and 406b may be registered with one or more of the servers 404a-404c. Different data storage systems may be registered with different servers and event dispatchers as a form of load balancing the event notifications and reporting from each of the different data storage systems 406a-406b. A management station may then subscribe to particular event dispatchers in accordance with which particular data storage system reports to which server. It should be noted that an embodiment may also have more than one event dispatcher executing on a single server. Additionally, an embodiment may use a switch as one of the servers upon with one or more of the event dispatchers execute. These and other variations of the examples illustrated will be appreciated by those of ordinary skill in the art.

In one embodiment, rather than have a particular management station or other registrant register independently with a primary and secondary event dispatcher, a secondary or failover event dispatcher and server may be designated automatically as a result of registering with the primary. For example, a management station registering with the event dispatcher on 404c may automatically have the event dispatcher on 404b assigned as the secondary or failover event dispatcher. In the event that 404c goes down or offline, management station 402c may automatically receive reports from the event dispatcher on server 404b. In order to facilitate this type of failover, each event dispatcher on a server may also register with one or more other dispatchers to share registration information. When a management station such as 402c registers, for example, with the event dispatcher of server 404c, the registration information may automatically be shared with the designated secondary or failover server 404b so that the event dispatcher executing thereon may have access to the registration information of management station 402c in the event that server 404c goes down or otherwise is unavailable.

The asynchronous event reporting occurs with respect to events reported by the device drivers in kernel mode or other event generating applications (e.g., such as 206 of FIG. 5) executing in user mode. These events may be consolidated, dispatched, and subsequently reported to the one or more registrants.

Figure 8:
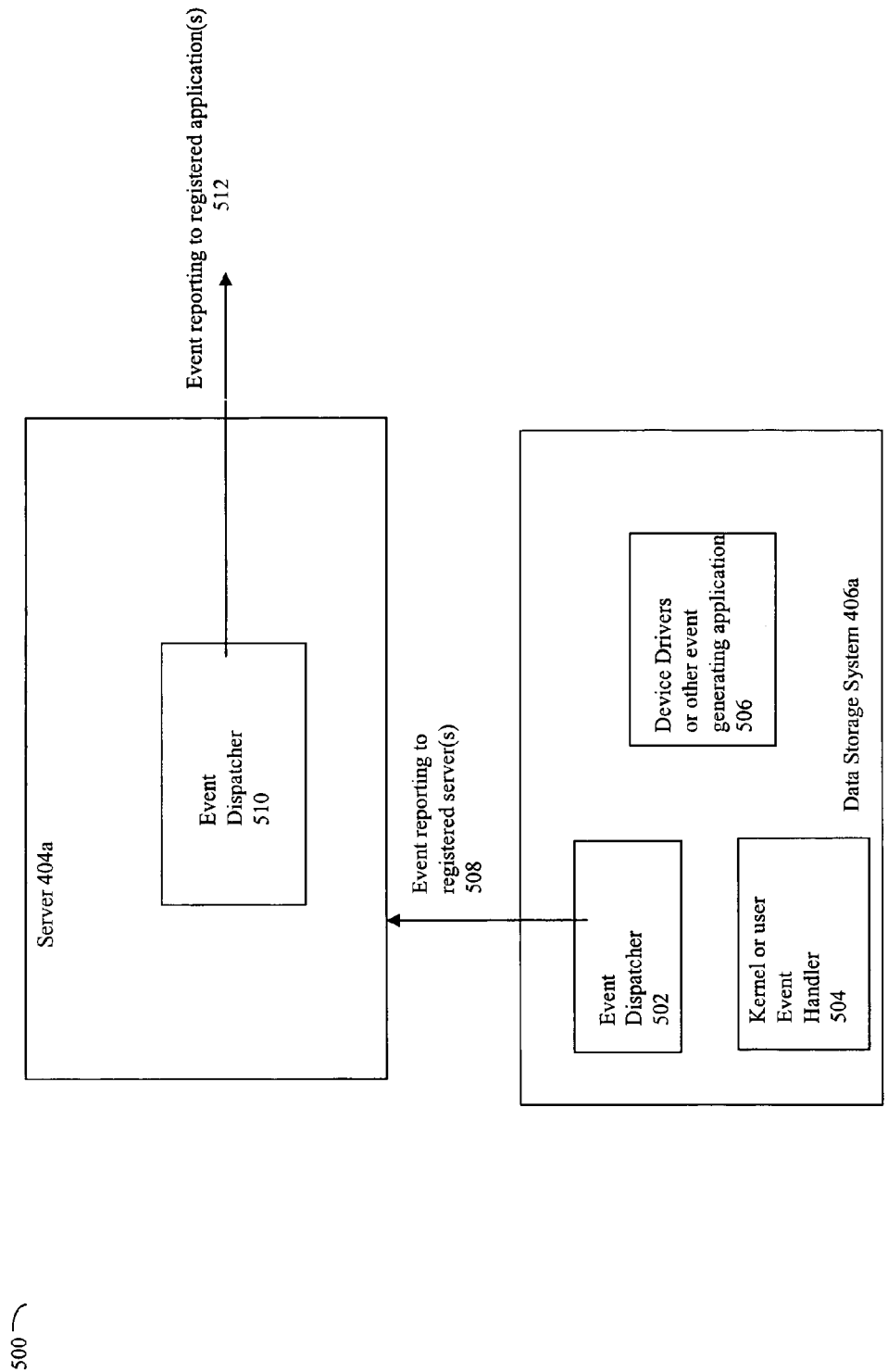
FIG. 8 is an example illustrating in more detail communication between components included in FIG. 7.

Referring now to FIG. 8, shown is an example 500 illustrating in more detail communication between a portion of the components included in the example 400 of FIG. 7. The example 500 of FIG. 8 illustrates in more detail the communications that may occur between components of a data storage system such as 406a and a particular server such as 404a. Only a single server 404a and a single data storage system 406a are included in the example 500 of FIG. 8 for the purposes of illustration. Other components included in FIG. 7 may operate in a similar manner.

Included in the data storage system 406a is an event dispatcher 502, a kernel or user event handler 504, and a device driver or other event generating application 506. In this example, the data storage system 406a may include an event handler executing in kernel or user mode in accordance with the execution mode of element 506. For example, if a device driver reports events to event handler 504, then the event handler 504 may be characterized as a kernel event handler as illustrated, for example, in connection with FIG. 4. In the event that the event generating application is not a device driver or other component executing in kernel mode but rather executes in user mode (e.g., when using software for hardware emulation), then the event handler 504 may be a user event handler executing in user mode. As illustrated in FIG. 8, the event handler 504 communicates with the event dispatcher 502 on the data storage system. The event dispatcher 502 of the data storage system asynchronously reports events to particular servers, as illustrated by arrow 508, with which the data storage system 406a is registered. In this example, the data storage system 406a is registered as reporting events to server 404a. The event dispatcher 510 on server 404a receives the event reported by the event dispatcher 502 and subsequently and asynchronously reports these events to registered applications as indicated by arrow 512.

The embodiment illustrated in FIG. 7 and in more detail in FIG. 8 uses an arrangement in which two event dispatcher components communicate with each other. One of the two event dispatcher receiving a communication from the other dispatcher may be characterized as a top or high level event dispatcher which subsequently reports events to the registered applications. It should be noted that the foregoing example illustrated in connection with FIGS. 7 and 8 may be characterized as using a hierarchical arrangement of event dispatchers for asynchronous event notification of the data storage system. An embodiment may include more than the number of levels of reporting between event dispatchers than as illustrated in connection with FIGS. 7 and 8.

Figure 9:
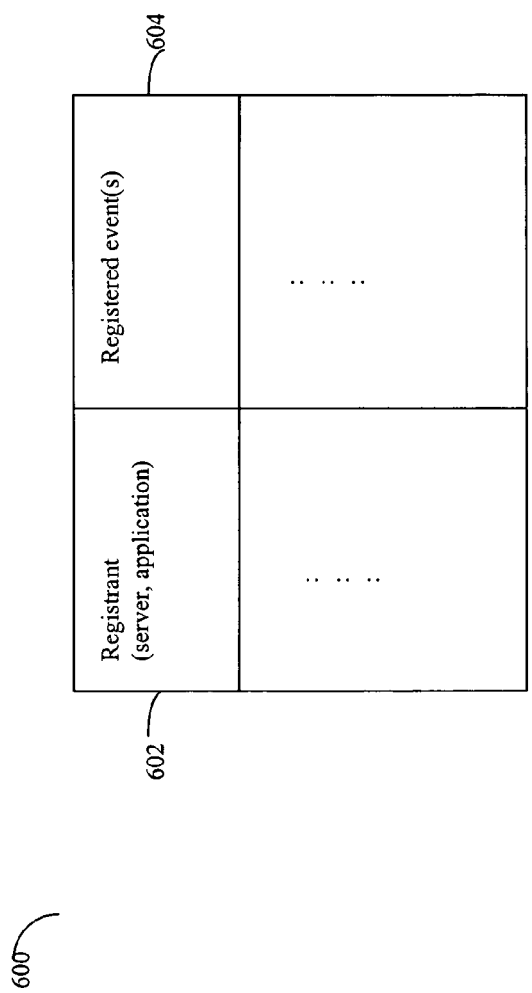
FIG. 9 is an example representation of information that may be stored in connection with registration of a subscriber.

Referring now to FIG. 9, shown is an example representation 600 of information that may be stored in connection with registration of an event subscriber or registrant. The information included in 600 may be stored, for example, for access by an event dispatcher. The event dispatcher may use the information in 600, for example, in connection with the processing steps of the flowchart of FIG. 4B. An entry may be included in 600 for each registrant. Each entry may be completed as a result of completing registration for events. As described herein, a registrant may be, for example, an application or other component such as a management component. Each entry in 600 may include a field 602 and a field 604. Information included in field 602 may provide a server name or other address designation, as well as any other information needed to identify a location of a particular registrant. Event reports may be sent to the location identified using 602. Additionally, associated with each of the entries in 600 may be registered event information included in field 604. Registered event information 604 may include, for example, data used to identify the particular events about which a particular registrant is notified. The designation of particular events using data from 604 may vary in accordance with each embodiment. For example, an embodiment may provide for a 3-level severity classification of events as described elsewhere herein. Included in 604 may be the particular data storage systems or devices of interest to a registrant. A registrant may identify which events to receive in accordance with a severity classification level assigned to an event. An embodiment may also include different categories of events regarding device type classification. The information included in 604 may be used by the event dispatcher to discern which events to report to each registrant. The particular information stored in the table 600 may vary in accordance with each embodiment and the techniques used in connection with identification of a particular subscriber, as well as the particular categorization of events within an embodiment.

It should be noted that an embodiment such as illustrated in connection with FIGS. 7 and 8 may also include registration information made available to the event dispatchers regarding which data storage system report to the particular event dispatchers and servers. Thus, this type of information may also be stored on each of the servers 404a-404c as well as the information about the particular subscribers in an embodiment such as illustrated in connection with FIGS. 7 and 8. The foregoing information regarding which data storage systems report to which servers may be used in connection with an application determining which event dispatchers to subscribe to.

Figure 10:
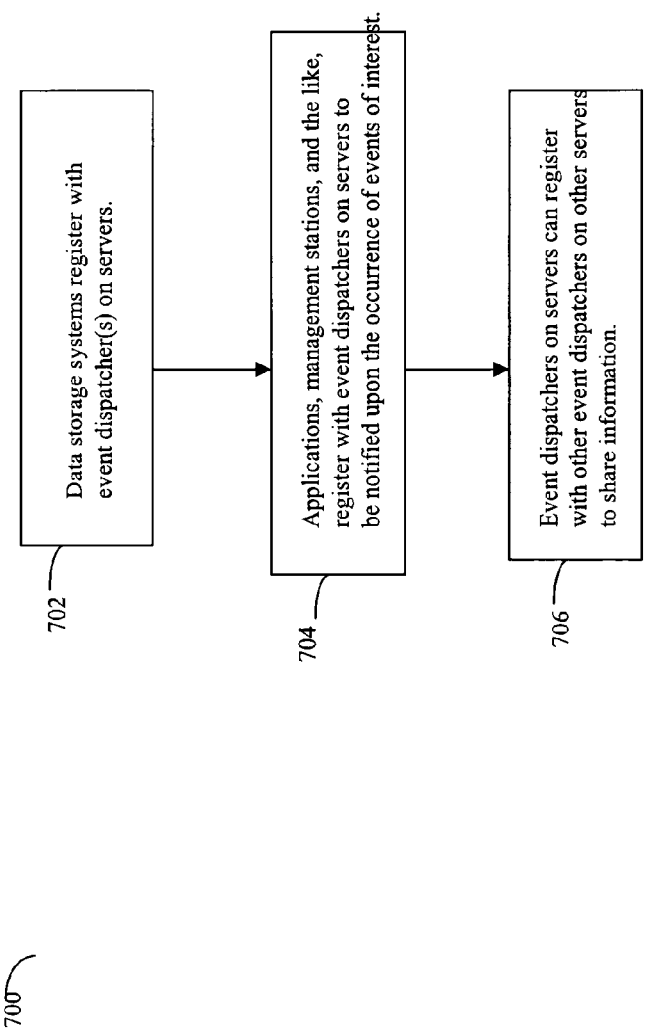
FIG. 10 is a flowchart of processing steps that may be performed in an embodiment in connection with event registration.

Referring now to FIG. 10, shown is a flowchart 700 of processing steps that may be performed in an embodiment in connection with event registration. In particular, the flowchart steps of 700 illustrate and summarize the processing steps for registration in connection with FIGS. 7 and 8. At step 702, the data storage system or systems are registered with particular event dispatchers on one or more servers. Step 702 may include, for example, each of the data storage systems being designated as reporting to one or more of the servers such as 404a-404c. At step 704, applications, management stations and other subscribers may register with event dispatchers on servers such as 404a-404c to subscribe to particular events of interest. At step 706, event dispatchers on the servers can register with other event dispatchers on other servers to share information. One example use of sharing registration information has been described elsewhere herein in connection with use of a primary and a failover or secondary event dispatcher.

What will now be described are various techniques that may be implemented within an event handler for event consolidation and reporting. As previously described, any one or more conditions and criteria may be used in connection with event consolidation and reporting, for example, when a kernel event handler or user event handler reports to an event dispatcher. As also described herein, such consolidation may provide for improved performance and event handling within a system that utilizes many data storage systems generating many events. In connection with a single physical event, it should be noted that multiple event notifications may occur.

An event handler may use any one of a variety of different techniques in connection with event data consolidation. For example, an event handler may report events of a particular severity level upon receipt independent of other consolidation criteria. If a particular event is not of a predetermined severity level, the event handler may store the event for inclusion in a consolidated event report. At some later point, the saved or consolidated events are also reported from the event handler to the event dispatcher. This may occur, for example, when a particular amount of time has passed, when a buffer holding the saved or consolidated events has been filled up, and the like. Thus, an event handler may implement policies and techniques in connection with reporting such that, for example, critical events of a particular priority level are reported in a more timely fashion than other less critical events which are reported in a consolidated report. The batched or consolidated events may be subsequently reported by the event handler in accordance with any one or more other conditions such as, for example, an amount of data and/or time. As also described herein, the classification of particular events may vary in accordance with, for example, each particular device and other categorizations that may be used in an embodiment.

An embodiment may use any one of a variety of different techniques in connection with implementation of the kernel event handler. An embodiment may allow a user to define particular criteria used in connection with event consolidation by the event handler. An embodiment may provide an interface for a user-defined function to be specified which is invoked when event consolidation processing is to be performed by the event handler. User-defined event consolidation processing may be included in an embodiment for use in conjunction with a set of defined event consolidation techniques that may be included in a particular data storage system. As an example, an embodiment may invoke a user defined function for event consolidation if such a function is defined. Otherwise, if no such user-defined function is specified, a default vendor or system supplied kernel or user event handler may be invoked.

In connection with registration in an embodiment, for example, as illustrated in FIGS. 7 and 8, registration with particular dispatchers by both the data storage systems and subscribers may be performed in accordance with a load balancing technique or criteria that may be utilized in an embodiment. For example, event dispatcher and/or server load information may be shared and used in connection with distributing reporting to various registrants among the different servers. Such load distribution may be performed without knowledge of a particular registrant and registration may accordingly be shared with other dispatchers. The load balancing may be performed in accordance with any one of a variety different static and/or dynamic criteria that may be specified in an embodiment. Such criteria may include, for example, the number of registrants to whom events are reported by each of the different servers, examining historic information about previous event reporting by each dispatcher and/or server to distribute future event reporting, and the like.

It should be noted that the particular information reported with each event between the event handler 504 and the event dispatcher 502 as well the particular information reported to each of the different registrants may vary in accordance with each embodiment. The particular information reported may vary, for example, in accordance with the severity of an event. In the event of a serious or fatal error, additional information may be reported with the initial message or otherwise logged and stored elsewhere.

The foregoing describes techniques that may be used in connection with data storage system management using asynchronous event notification. The asynchronous event notification occurs when an event is reported to an event handler. In one embodiment, each of the event handlers then reports events to an event dispatcher. Ultimately, an event dispatcher may asynchronously report the occurrence of events to one or more registrants in accordance with registration information.

It should be noted that those with ordinary skill in the art may implement the techniques described herein with other variations of the embodiments describer and with varying number of levels than as illustrated herein, for example, in connection with FIGS. 7 and 8. Additionally, particulars, such as kernel and user mode/space have been used to designate different levels or modes of execution. Other embodiments utilizing the techniques herein may include different designations than "user" and "kernel" as described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for event reporting in a data storage system comprising:
   asynchronously reporting at least one data storage system event generated in response to an occurrence in the data storage system to an event handler; and reporting, by said event handler, said at least one data storage system event in an event report to an event dispatcher in accordance with at least one event reporting criteria, wherein said event dispatcher is a first event dispatcher in a hierarchy of event dispatchers, one or more others of said event dispatchers receiving notification of events from said first event dispatcher.

2. The method of claim 1, further comprising:
notifying, by said one or more others of said event dispatchers, one or more event registrants in accordance with registration information for each of said one or more event registrants.

3. The method of claim 2, wherein one of said event registrants is a software management component.

4. The method of claim 2, wherein a first of said one or more others of said event dispatchers is a primary dispatcher and a first of said event registrants subscribes to said primary event dispatcher and a secondary event dispatcher, wherein event notification to said first event registrant is performed by said secondary event dispatcher in the event that said primary event dispatcher is unable to perform event notification to said first event registrant, said primary and secondary event dispatchers sharing registration information about said first event registrant.

5. The method of claim 1, wherein said event handler executes in kernel mode, and the method further comprising:
receiving notification of said at least one data storage system event from a device driver.

6. The method of claim 1, wherein said event handler executes in user mode and the method further comprising:
receiving notification of said at least one data storage system event from a software component executing in user mode.

7. The method of claim 1, wherein said at least one event reporting criteria includes at least one of: a threshold event severity level, an event type, a time period, a message count, and a buffer size.

8. The method of claim 7, wherein said at least one event reporting criteria includes gathering events below said threshold event severity level for consolidated reporting to said event dispatcher in accordance with one of said time period, said message count or said buffer size.

9. The method of claim 8, wherein said at least one event reporting criteria includes reporting, upon receipt, all events having at least said threshold event severity level or events of said event type.

10. The method of claim 1, wherein a second event dispatcher of said one or more others of said event dispatchers and a third event dispatcher of said one or more others of said event dispatchers each report to at least one event registrant regarding a different set of events.

11. The method of claim 1, wherein said event handler and hierarchy of event dispatchers execute in user space, and one or more event generating applications executing in user space are one or more software emulation layers that perform said asynchronously reporting of data storage events to said event handler, wherein said one or more event generating applications are used rather than one or more device drivers.

12. A system comprising:
at least one data storage system including:
a data storage system event generator;
an event handler in communication with said data storage system event generator, said event handler asynchronously receiving notification of event occurrences from said data storage system event generator and performing event reporting consolidation in accordance with at least one criteria; and
a hierarchy of event dispatchers including a first event dispatcher that receives notification of events from said event handler and dispatches notification of events to at least one other component, said hierarchy of event dispatchers including one or more other event dispatchers receiving notification of events from said first event dispatcher; and
at least one registrant that receives notification of said events from said one or more other event dispatchers.

13. The system of claim 12, wherein said data storage system event generator is a device driver.

14. A system comprising:
at least one data storage system including:
a data storage system event generator;
an event handler in communication with said data storage system event generator, said event handler asynchronously receiving notification of event occurrences from said data storage system event generator and performing event reporting consolidation in accordance with at least one criteria; and
an event dispatcher that receives notification of events from said event handler and dispatches notification of events to at least one other component; and
at least one registrant that receives notification of said events; and
a second event dispatcher in communication with said event dispatcher, said second event dispatcher receiving notification of events from said event dispatcher, said second event dispatcher notifying said at least one registrant of events in accordance with subscription information associated with said at least one registrant.

15. A computer program product for event reporting in a data storage system comprising code that:
asynchronously reports at least one data storage system event generated in response to an occurrence in the data storage system to an event handler; and
reports, by said event handler, said at least one data storage system event in an event report to an event dispatcher in accordance with at least one event reporting criteria, wherein said event dispatcher is a first event dispatcher in a hierarchy of event dispatchers, one or more others of said event dispatchers receiving notification of events from said first event dispatcher.

16. The computer program product of claim 15, further comprising code that:
notifies, by said one or more others of said event dispatchers, one or more event registrants in accordance with registration information for each of said one or more event registrants.

17. The computer program product of claim 16, wherein a first of said one or more others of said event dispatchers is a primary dispatcher and a first of said event registrants subscribes to said primary event dispatcher and a secondary event dispatcher, wherein event notification to said first event registrant is performed by said secondary event dispatcher in the event that said primary event dispatcher is unable to perform event notification to said first event registrant, said primary and secondary event dispatchers sharing registration information about said first event registrant.

18. The computer program product of claim 15, wherein said event handler executes in kernel mode, and the computer program product further comprising code that:
receives notification of said at least one data storage system event from a device driver.

19. The computer program product of claim 15, wherein said event handler executes in user mode and the computer program product further comprises code that:

receives notification of said at least one data storage system event from a software component executing in user mode.

20. The computer program product of claim 15, wherein said at least one event reporting criteria includes at least one of: a threshold event severity level, an event type, a time period, a message count, a buffer size, gathering events below a threshold event severity level for consolidated reporting to said event dispatcher in accordance with one of said time period, said message count or said buffer size, and reporting, upon receipt, all events having at least said threshold event severity level or events of said event type.

* * * * *